United States Patent

[11] 3,623,684

[72] Inventor Ralph O. Kline
        Stow, Ohio
[21] Appl. No. 12,407
[22] Filed Feb. 18, 1970
[45] Patented Nov. 30, 1971
[73] Assignee The Goodyear Tire Company
        Akron, Ohio

[54] DEICING DEVICE
    17 Claims, 5 Drawing Figs.
[52] U.S. Cl. ................................... 244/134 A
[51] Int. Cl. ..................................... B64d 15/18
[50] Field of Search .......................... 244/134 A,
        146, 44, 98; 343/704; 5/60, 348; 297/284, DIG. 3;
        9/2 A

[56] References Cited
        UNITED STATES PATENTS
2,937,826  5/1960  Johnson ..................... 244/134 (A)
2,536,739  1/1951  Greene ....................... 244/134 (A)
2,656,996  3/1951  Hovland ..................... 244/146 X

*Primary Examiner*—Milton Buchler
*Assistant Examiner*—Gregory W. O'Connor
*Attorneys*—F. W. Brunner and Ronald P. Yaist

ABSTRACT: An improved deicing device or ice guard, preferably in the form of an inflatable deicing cover of flexible material including pneumatically responsive means for breaking or fracturing ice formations, such as extensible inflation tubes, and a manifold structure having an outer chamber with orifices therein and at least one inner chamber with similar orifices or openings therein to conduct and distribute an inflation media to the ice breaking means. The manifold structure provides an unrestricted passage for the inflation and deflation of the deicing device.

PATENTED NOV 30 1971 3,623,684

INVENTOR
RALPH O. KLINE

BY:
*R P Yaist*
ATTORNEY

INVENTOR
RALPH O. KLINE
BY:
ATTORNEY

DEICING DEVICE

BACKGROUND OF THE INVENTION

This invention relates to deicing devices or ice guards for aircrafts, ships and the like. More particularly, this invention relates to flexible inflatable covers adapted to protect surfaces, such as wings or other airfoils, subject to the accumulation of ice formations.

Pneumatic deicing devices or ice guards have long been used to prevent the continuous accumulation of ice formations on surfaces such as airfoils. Typically, these ice guards are in the form of an inflatable boot or cover composed of plies or layers of flexible material, such as natural or synthetic rubber or rubberlike material, preferably reinforced by textile fabric or rubberized fabric material. The covers are constructed so that when in service, as for example on an aircraft during flight, the layer that is exposed to ice formations is distorted by the application and release of pneumatic pressure, thereby causing the ice formations to break and be removed by the action of the air rushing past the airfoil.

In operation during icing conditions, for example, an inflation media such as air is introduced into the cover from a suitable source of pneumatic pressure and conducted through the cover by means of manifold passages or conduits disposed between the cover layers. These manifold structures serve to distribute the inflation media to various inflation passages or chambers commonly in the form of elongated tubes which are also disposed between the cover layers. The tubes are inflated in this manner and upon the release of the pneumatic pressure, a vacuum is created, thereby collapsing the tubes. The rapid alternate inflation and deflation of the tubes causes a distortion of the top cover layer of the deicing device which breaks up or fractures the ice formation.

The covers are ordinarily installed over the leading edge of the airfoil with the ice-breaking inflation tubes running either spanwise or chordwise of the airfoil and the pressure distributing manifolds running oppositely from the inflation tubes either in a chordwise or spanwise direction. Often it is necessary to provide more than one manifold conduit or passage when the continuity of the inflation tubes is interrupted by the presence of cutout portions in the deicing cover made necessary, for example, for the purpose of installing such devices as stall warning indicators, landing lights and the like required for the proper operation of the aircraft. The deicing arrangement then includes a main or primary manifold normally connected to the source of pneumatic pressure to distribute the inflation media to various inflation tubes and a secondary manifold at a remote distance from the primary manifold to distribute the inflation media to other inflation tubes. A common problem associated with such previously described deicing arrangements is that the inflation media is prevented from reaching inflation tubes remotely located from the pneumatic pressure source because of the collapse of the secondary manifold structure. This may be caused by the top ply or layer of the deicing cover being pulled down during installation across the leading edge, thereby preventing the proper passage of the inflation media through the manifold and also in some instances, preventing the evacuation of the inflation media from the manifold and inflation tubes when the pneumatic pressure is released. In addition, it may also be due to a vacuum collapse occuring during operation of the deicing cover.

One means of overcoming this problem has been to provide raised portions or lands in the manifold conduit lengthwise thereof to prevent its complete collapse and to allow a sufficient quantity of inflation media to be conducted therethrough. However, the lands cause an undue localized buildup in the manifold structure which may interfere with the proper aerodynamic functioning of the airfoil and furthermore, results in a bulky, unattractive appearance.

It has been found that these problems are more satisfactorily overcome by the improved deicing device or ice guard apparatus of the present invention which will be hereinafter disclosed.

OBJECTS OF THE INVENTION

It is an object of this invention to provide an improved deicing device including a manifold structure which will not collapse under operating conditions.

It is another object of this invention to provide an improved deicing cover which will allow adequate flow of an inflation media through the manifold structure without the use of lands in the manifold which cause undue bulkiness of the deicing cover.

It is still another object of this invention to provide an improved manifold structure for a deicing device which includes an unrestricted inner passage therein to prevent the complete collapse of the manifold.

In accordance with the present invention, the above objects are accomplished by providing an improved deicing device including pneumatically responsive means for fracturing the ice and at least one pressure-distributing manifold passage communicating therewith to conduct an inflation media thereto. The manifold passage includes an outer chamber of flexible material having a plurality of orifices or inflation ports extending through a wall thereof to allow for the flow of inflation media to and from the pneumatically responsive means and at least one inner chamber of flexible material supported within the outer chamber and having a plurality of orifices or apertures extending through a wall thereof to facilitate the flow of inflation media from and into the outer chamber with the inner chamber providing an unrestricted passage within the manifold passage for the inflation and deflation of the deicing device.

DESCRIPTION OF THE PREFERRED EMBODIMENT

Figure 1:
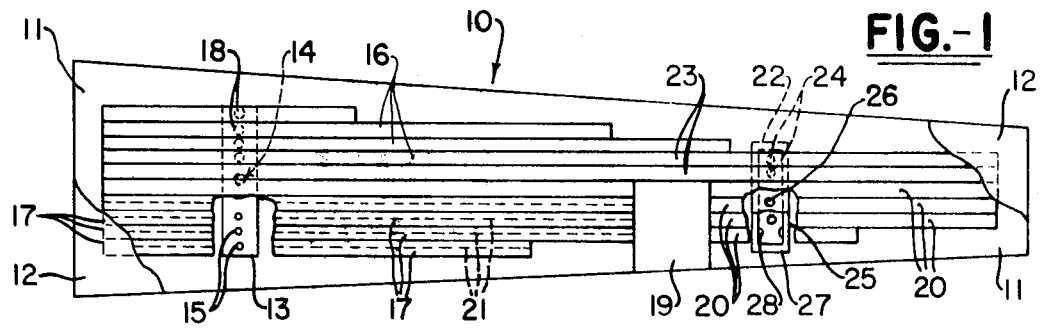
FIG. 1 is a plan view from above of the inflatable deicing cover including the manifold structure of this invention prior to installation, parts being broken away.

In FIG. 1, a deicing device or ice guard is shown in the form of an inflatable cover 10 prior to its installation, for example, on an aircraft having surfaces subject to the continuous accumulation of ice formations. The cover 10 includes a bottom cover layer 11 which is adapted to be adhered to the surface to be protected, and a top cover layer 12 which is positioned in overlying relationship to the bottom layer 11 and which, during the operation of the deicer, is exposed to ice formations. The layers 11 and 12 are composed preferably of elastomeric material, such as natural or synthetic rubber, reinforced by a textile fabric such as cotton, nylon, rayon or polyester. In the embodiment shown in FIG. 1, the top layer 12 has been partially removed to reveal the remaining components of the cover 10.

As illustrated, the cover 10 also includes a primary manifold structure in the form of a passage or conduit 13 disposed between the cover layers 11 and 12. The primary manifold 13 has means therein, such as a valve port 14, for receiving an inflation media, such as air, from a source of pneumatic pressure (not shown) during the operation of the deicing device and also includes a plurality of orifices or inflation ports 15 therein extending radially through the wall thereof for the purpose of distributing the flow of inflation media. The manifold conduit 13 is preferably composed of a rubberized fabric material.

The cover 10 also includes means disposed between the cover layers 11 and 12 such as a plurality of extensible chambers or passages such as inflation tubes 16 for breaking or fracturing the ice by distorting the exposed portion of the top layer 12 in response to the application and release of pneumatic pressure. The tubes 16 are preferably composed of a pressure-retaining fabric-reinforced elastomeric material similar to that used in the construction of the manifold conduits 13. The inflation tubes 16 are connected to, and preferably disposed above, the manifold 13. For example, a first group 17 of the tubes 16 communicates with the primary pressure-distributing manifold 13, for instance by means of crossover passages 18 disposed over the inflation ports 15 to receive the inflation media.

As is apparent in FIG. 1, the continuity of at least some of the inflation tubes 16 are interrupted by a cutout portion 19 in the cover which is provided for the purpose of installing such devices as stall warning indicators, landing lights and the like, required for the proper operation of the aircraft. A second group 20 of the tubes 16 is provided on the opposite side of the cutout portion 19 from the first group of tubes 17 and at a distance remote from the primary manifold structure 13. Venting means such as channels 21 are provided in the inflation tubes 16 to allow proper bleeding of the inflation media during inflation and deflation of the deicing cover 10.

A secondary manifold structure in the form of a passage or conduit 22 is provided between the layers 11 and 12 of the cover 10 in order to distribute the flow of inflation media to the second group of tubes 20 connected to and preferably disposed above the secondary manifold 22. Two tubes 23 of the first group of inflation tubes 17 communicate with the secondary manifold 22 through a common crossover passage 24 to thereby provide a flow of inflation media thereto. The secondary manifold conduit 22 includes an outer chamber preferably in the form of an elongated tube 25 of flexible, pressure-retaining material, such as rubberized fabric of a similar construction to that of the primary manifold conduit 13, and likewise includes a plurality of inflation ports 26 extending radially through the wall thereof.

The manifold conduit 22 further includes an inner chamber such as an elongated tube 27 of flexible pressure-retaining material disposed and supported within the outer tube 25 and having a plurality of openings or apertures 28 extending radially therethrough. The inner tube 27 is preferably composed of a rubberized fabric material or a woven textile fabric material, but also may be composed of an elastomeric formulation. An important consideration of this regard is that the inner tube 27 have sufficient strength to avoid complete collapse during deflation of the deicing cover 10 so as to restrict the flow of air or other inflation media. Furthermore, the inner tube 27 should terminate short of the end of the outer tube 25 to prevent the entrapment of air at the ends of the tubes 25 and 27.

Figure 2:
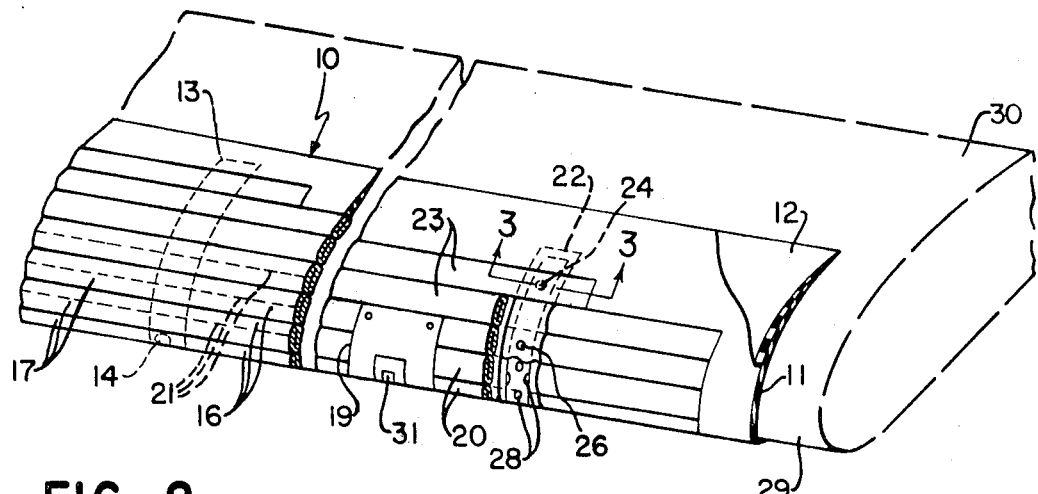
FIG. 2 is a perspective view of the deicing cover of FIG. 1 as installed over the leading edge of an aircraft wing or airfoil.

In FIG. 2, the deicing cover 10 is shown as installed over the leading edge 29 of an aircraft wing or airfoil 30. At least a portion of the bottom cover layer 11 is preferably attached to the airfoil 30 by a suitable adhesive cement but mechanical means such as screws or rivets may also be employed. Accordingly, the top cover layer 12 is exposed to accumulations of ice. In the embodiment shown, the pressure-responsive inflation tubes 16 extend substantially spanwise of the airfoil 30 and communicate with the primary manifold 13 and the secondary manifold 22 which extend substantially chordwise of the airfoil 30. Of course, it is to be understood that the inflation tubes 16 can also extend chordwise of the airfoil 30 with the manifolds 13 and 22 extending angularly thereto in a substantially spanwise direction. The particular arrangement will vary with the specific application. A stall warning device 31 is provided in the cutout portion 19 of the cover 10 which prevents the continuation of the first group of tubes 17 and makes necessary the second group of tubes 20 which communicate with the secondary manifold conduit 22.

In operation, an inflation media, preferably air, is introduced into the primary manifold 13 through the valve port 14 from a source of pneumatic pressure (not shown) such as a pump located in the aircraft and is distributed by the manifold 13 into the first group of inflation tubes 17. Two tubes 23 of the first group of inflation tubes 17 conduct the inflation media into the secondary manifold structure 22 where it is distributed to the second group of inflation tubes 20. Upon the rapid alternate application and release of pneumatic pressure, the inflation tubes 16 distort to fracture or break any ice formations which have accumulated on the layer 12 of the cover 10. Once the ice formation is fractured, the movement of air over the airfoil surface removes the ice from the surface.

Figure 3:
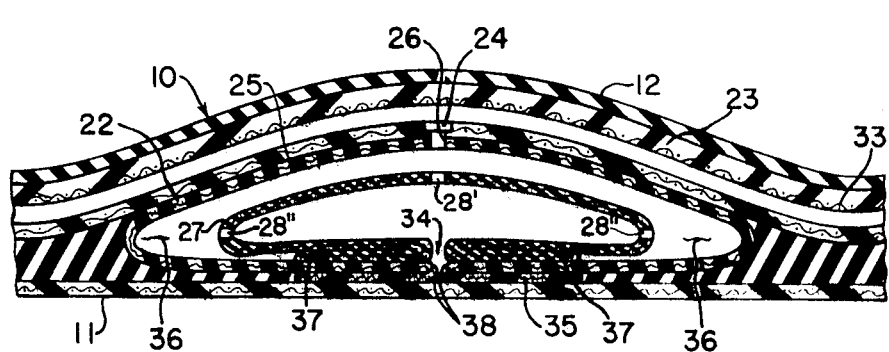
FIG. 3 is an enlarged sectional view taken on line 3—3 of FIG. 2 showing the deicing cover in its uninflated condition.
Figure 4:
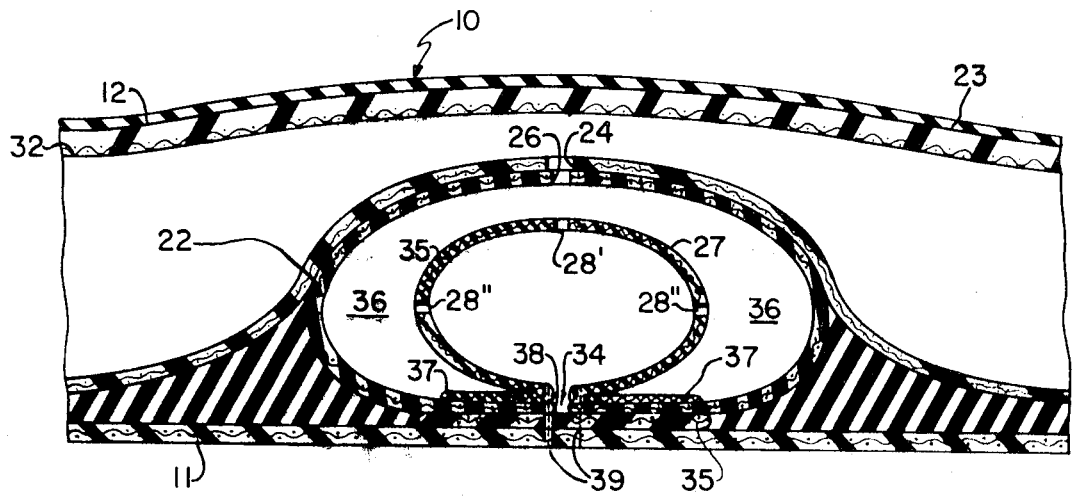
FIG. 4 is an enlarged sectional view like FIG. 3 but showing the deicing cover in its inflated condition.
Figure 5:
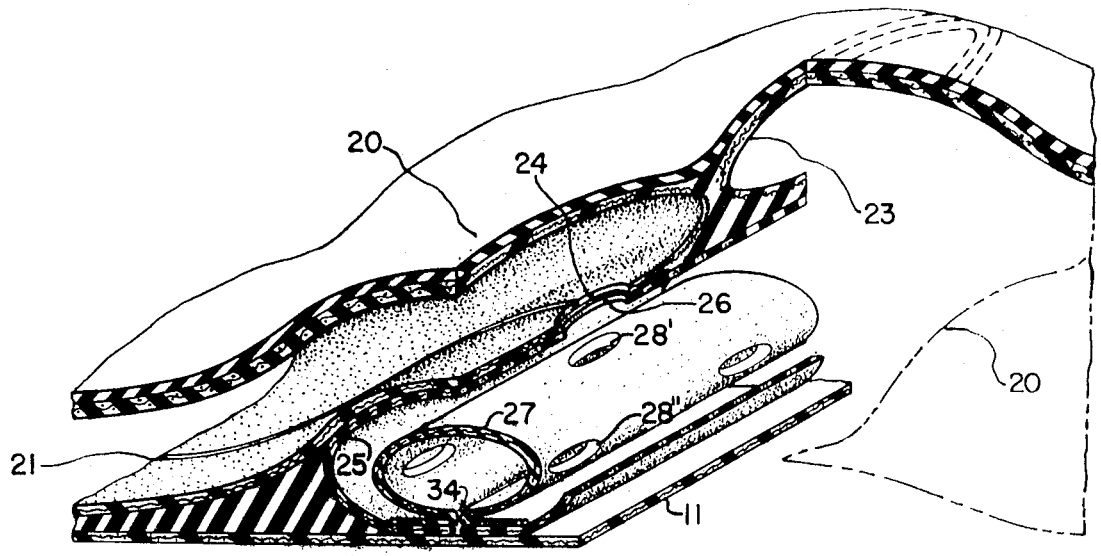
FIG. 5 is an enlarged perspective view of a portion of the deicing cover of FIG. 2 showing the improved manifold structure of this invention.

FIGS. 3, 4 and 5 most clearly illustrate the detailed construction features of the manifold structure 22 of this invention in communication with the ice-breaking chambers or inflation tubes 23. The inflation tubes 23 are composed of natural or synthetic rubber reinforced by an extensible nylon fabric layer 32. Each tube 23 passes over and is disposed above the manifold conduit 22 and includes a crossover port or passage 24 in the bottom portion which communicates with the manifold 22 for the passage of air under pressure. For this purpose, the bottom of the tube 23 is preferably joined or bonded by vulcanization to the outer tube 25 of the manifold 22 along the length of the intersection thereof.

The outer chamber or tube 25 of the manifold structure 22 is composed of a suitable natural or synthetic elastomeric material preferably having low diffusion properties and is reinforced by a layer 33 of square-woven cotton fabric for added strength. The tube 25 includes a plurality of inflation ports 26 extending radially through the wall thereof and preferably are aligned with a crossover passage 24 provided through the bottom of the inflation tube 23 to allow the passage of air between the inflation tube 23 and the outer tube 25 of the manifold 22. The passages 24 are preferably larger than the ports 26 but may also be the same size or even slightly smaller in diameter.

The inner chamber or tube 27 is supported within the outer tube 25. Preferably, this is accomplished by joining a portion of the inner tube 27 to a portion of the outer tube 25 by means of suitable adhesives. The outer tube 25 and inner tube 27, as will be hereinafter described, are preferably formed in such a manner as to define a channel 34 along the length thereof in the area of support of the inner tube 25. A seam closure strip 35 of elastomeric material or fabric-inserted elastomeric material is preferably positioned below the outer tube 25 to complete the manifold conduit 22. The strip 35 may also be provided between the outer and inner tubes 25 and 27 if desired but this will lessen the depth of the channel 34. Preferably, the inner tube 27 has a wall thickness less than the wall thickness of the outer tube 25 to prevent an undue buildup or thickness in the manifold structure 22 which may interfere with the proper aerodynamic functioning of the airfoil 30 and, furthermore, cause an unattractive appearance.

A plurality of apertures 28' and 28" are provided radially through the wall of the inner tube 27 to facilitate the flow of air from and into the outer tube 25. The apertures 28' and 28" are preferably smaller than the ports 26 but may also be approximately the same size or even slightly larger in diameter without adversely affecting the functioning of the manifold structure 22.

As is best illustrated in FIG. 5, the apertures 28' and 28" in the inner tube 27 may be in substantial alignment with at least some of the ports 26 of the outer tube 25 but may also be in substantial nonalignment since the flow of inflation media is not affected in either case. Also, the ports 26 in the outer tube 25 and the apertures 28' and 28" of the inner tube 27 may be spaced uniformly or in a random manner lengthwise of the respective tubes 25 and 27. In the arrangement shown in FIG. 5, a row of apertures 28' is positioned in the top portion of the tube 27 in substantial alignment with the ports 26 and another row of apertures 28" are centered between each aperture 28' and rotated approximately at right angles therefrom. Additionally, as shown in FIGS. 3 and 4, the apertures 28" should be located to allow the rapid deflation or evacuation of air from the pockets 36 of the outer tube 25 at either side thereof.

In one method of constructing the manifold structure 22, the inner tube 27 is formed from a first rectangular ply of rubberized fabric or other suitable material having its lateral margins 37 turned under. One side of the first ply is preferably precured to prevent the ply from adhering together. The desired size orifices or apertures 28 are then mechanically punched or cut through the rubberized fabric ply. The margins 37 of the inner tube 27 are then adhered by a suitable adhesive to the inner surface of a second rectangular rubberized fabric ply which is used to form the outer tube 25. A space or gap is allowed parallel to and even with the margins 37 along the length thereof. The outer tube 25 is formed by the second rubberized fabric ply having one side precured as in the case of the first ply. A similar elongated gap is provided between the lateral edges 38 of the second ply aligned with the gap of the inner tube 27, thereby defining the longitudinal channel 34. The orifices or ports 26 are then punched or cut through the wall of the outer tube 25. The seam closure strip 35 is then incorporated to complete the manifold conduit structure 22. The manifold conduit 22 is then disposed between the cover layers 11 and 12 together with the inflation tubes 16 and this assembly is vulcanized to form the complete deicing cover 10.

As should be apparent from the foregoing description, the deicing covers of this invention may be formed and vulcanized by conventional methods well known in the art. For example, the various components such as plies, layers, strips and tubes of fabric-containing elastomeric material, may be joined by means of suitable rubber adhesives and the assembled components subsequently vulcanized under heat and pressure in an autoclave unit.

It is, of course, possible to provide both the primary manifold 13 and the secondary manifold 22 and even several additional manifolds with at least one inner chamber or tube as taught by this invention. On the other hand, this invention is also applicable where only one manifold structure is provided in the deicing device.

The functioning of the secondary manifold structure 22 in communication with the inflation tubes 16 is also most clearly shown by reference to FIGS. 3, 4 and 5. During its deflated condition, as shown in FIG. 3, the air is evacuated from the inflation tube 23 which assumes a substantially collapsed or flattened state when viewed in cross section. In addition, the outer tube 25 and the inner tube 27 of the manifold structure 22 also are largely free of air, thereby assuming a similar flattened configuration. The apertures 28" allow the rapid evacuation of air from the pockets 36 of the inner tube 25. On the other hand, the presence of the inner tube 27 supported within the outer tube 25 prevents the total collapse of the outer tube 25 during the evacuation of air from the channel conduit 22. Furthermore, sufficient air is retained within the channel 34 when the source of pneumatic pressure is released to help provide an unrestricted passage to prevent the complete collapse of the manifold structure 22.

When the pneumatic pressure is applied, as shown in FIG. 4, the manifold 22 is inflated by receiving the inflation media from the tubes 23 of the first group of tubes 17 which now assume a semicircular shape during inflation, as is most clearly shown in FIG. 5. The inflation media travels through the crossover passage 24 between the inflation tube 23 and the outer tube 25 of the manifold structure 22 and through the inflation port 26 of the outer tube 25 and subsequently through the apertures 28 in the inner tube 27 of the manifold structure 22 to thereby inflate both the inner and outer tubes 25 and 27. The air or other inflation media is similarly conducted through the secondary manifold structure 22 by passing through the inner tube 27 into the outer tube 25 and through the ports 26 and cross over passages 24 therebetween into the second group of inflation tubes 20 which assume the largely semicircular inflated shape. The rapid alternate application and release of pneumatic pressure causes a distortion of the spanwise inflation tubes 16 which fractures the ice accumulations formed on the top layer 12 of the deicing cover 10.

As shown in broken lines in FIG. 4, the inflation media may also be directly introduced into the manifold structure of this invention through a valve opening or port 39 provided through the bottom cover layer 11 and wall of the outer tube 25 into the inner tube 27 of the manifold structure 22. In this case, the air or other inflation media is introduced directly into the inner tube 27, travels through the apertures 28 and into the outer tube 25 from which it flows through the inflation ports 26 and crossover passages 24 and into the inflation tubes 16.

It should be apparent to those skilled in the art that channel improved deicing device or ice guard cover of this invention includes a manifold structure which provides an unrestricted passage within the manifold for the inflation and deflation of the deicing device but yet enables the deicing device to assume an acceptable appearance without 27 are bulkiness.

While certain representative embodiments and details have been shown for the purpose of illustrating the invention, it will be apparent to those skilled in the art that various changes and modifications may be made therein without departing from the spirit or scope of the invention.

What is claimed is:
1. An improved inflatable deicing cover of flexible material adapted to protect a surface subject to the continuous accumulation of ice formations, said cover including:
   A. a first layer of flexible material having at least a portion thereof adhered to the surface to be protected;
   B. a second layer of flexible material in overlying relationship to said first layer having a portion thereof exposed to ice formations;
   C. means for distorting the exposed portion of said second layer to fracture and remove the ice formations, said means responsive to the application and release of pneumatic pressure;
   D. means therein for receiving an inflation media from a source of pneumatic pressure; and
   E. at least one manifold conduit communicating with said receiving means and with said pneumatically responsive distortion means to allow the passage of the inflation media from said receiving means into said distortion means, said manifold conduit comprising;
      1. an outer chamber of flexible material having a plurality of inflation ports extending through the wall thereof to allow flow of the inflation media therethrough to and from said distorting means, and
      2. an inner chamber of flexible material supported within said outer chamber and having a plurality of apertures extending through the wall thereof to facilitate the flow of the inflation media to and from said outer chamber with said inner chamber providing an unrestricted passage within said manifold conduit.

2. The cover as claimed in claim 1, wherein said receiving means is a valve port extending into said inner chamber through which the inflating media is conducted from the pneumatic pressure source.

3. The cover as claimed in claim 1, wherein said inner chamber is composed of a fabric material.

4. The cover as claimed in claim 1, wherein said outer chamber is an elongated tube having said inflation ports extending radially through the wall thereof and said inner chamber is an elongated tube having said apertures extending radially through the wall thereof.

5. The cover as claimed in claim 1, wherein said inner chamber has a wall thickness less than the wall thickness of said outer chamber.

6. The cover as claimed in claim 1, wherein a portion of said inner chamber is adhered to and supported by a portion of said outer chamber.

7. The cover as claimed in claim 6, wherein the manifold conduit further comprises at least one channel therein along the length thereof in the area of support of said inner chamber.

8. The cover as claimed in claim 7, wherein said outer chamber and said inner chamber cooperate to define a channel along the length of said manifold conduit.

9. The cover as claimed in claim 1, wherein said pneumatically responsive distorting means is a plurality of inflation tubes disposed between said first and second layers with each said tube communicating with at least one of said manifold conduits and extending in a direction angularly thereto.

10. The cover as claimed in claim 9, wherein said covers includes crossover passages connecting each said inflation tube to at least one said manifold.

11. The cover as claimed in claim 9, wherein the protected surface is a leading edge of an airfoil and said cover is provided over the leading edge with said inflation tubes extending substantially spanwise thereof and each said manifold extending substantially chordwise thereof.

12. The device as claimed in claim 9, wherein said cover includes a first manifold conduit disposed between said first and second layers having one area thereof connected to said receiving means to accept the flow of the inflation media therefrom and another area thereof connected to a first group of said inflation tubes extending therefrom to allow for the flow of the inflation media thereto, and a second manifold conduit disposed between said first and second layers and spaced at a substantial distance spanwise of said first manifold conduit and communicating therewith through at least one of said inflation tubes having a crossover passage in common therewith to receive the flow of the inflation media therefrom, said second manifold conduit connected to a second group of said inflation tubes extending therefrom to allow for the flow of the inflation media thereto.

13. The cover as claimed in claim 12, wherein said second manifold conduit comprises:
   A. an outer tube of flexible material having a plurality of inflation ports extending radially through the wall thereof to allow flow of the inflation media therethrough into said second group of inflation tubes; and
   B. an inner tube of flexible material supported within said outer tube and having a plurality of apertures extending radially through the wall thereof to facilitate the flow of the inflation media therethrough to and from said outer tube with said outer tube and said inner tube cooperating to define a channel along the length of said manifold conduit.

14. In a deicing system the combination of a source of pneumatic pressure, a protective inflatable cover for a surface subject to the continuous accumulation of ice formations and means for connecting said source to said cover to allow the flow of an inflation media therethrough, said cover including:
   A. a first layer of flexible material having at least a portion thereof adhered to the surface to be protected;
   B. a second layer of flexible material in overlying relationship to said first layer having a portion thereof exposed to ice formations;
   C. means for distorting the exposed portion of said second layer to fracture and remove the ice formations, said means responsive to the application and release of pneumatic pressure;
   D. means therein for receiving an inflation media from said source of pneumatic pressure; and
   E. at least one manifold conduit communicating with said receiving means and with said pneumatically responsive distortion means to allow the passage of the inflation media from said receiving means into said distortion means, the improvement wherein said manifold conduit comprises the combination of:
   1, an outer chamber of flexible material having a plurality of inflation ports extending through the wall thereof to allow flow of the inflation media therethrough into said distorting means, and
      (2) an inner chamber of flexible material supported within said outer chamber and having a plurality of apertures extending radially through the wall thereof to facilitate the flow of the inflation media therethrough with said inner chamber providing an unrestricted passage within said manifold conduit.

15. An improved manifold structure of the type used in a pneumatic deicing device to receive, conduct and distribute an inflation media thereto, said structure comprising:
   A. means for receiving the inflation media;
   B. an outer chamber of flexible material having a plurality of inflation ports extending through the wall thereof to allow flow of the inflation media therethrough; and
   an inner chamber of flexible material supported within said outer chamber and having a plurality of apertures extending through the wall thereof to facilitate the flow of the inflation media therethrough.

16. The improved manifold structure as claimed in claim 15, wherein said inner chamber is an elongated tube composed of a fabric material.

17. The improved manifold structure as claimed in claim 15, wherein a portion of each said inner chamber is adhered to and supported by a portion of said outer chamber.

* * * * *

PO-1050
(5/69)

UNITED STATES PATENT OFFICE
CERTIFICATE OF CORRECTION

Patent No. 3,623,684            Dated November 30, 1971

Inventor(s) Ralph O Kline

It is certified that error appears in the above-identified patent and that said Letters Patent are hereby corrected as shown below:

In the legend, Assignee should read --The Goodyear Tire & Rubber Company--.

Column 3, line 46, "of" should read --in--.

Column 5, line 51, delete "channel" and insert --manifold--.

Column 6, line 11, delete "channel" and insert --the--;

line 16, delete "27 are" and insert --undue--.

Column 8, line 37, insert --C.-- before "an".

Signed and sealed this 13th day of June 1972.

(SEAL)
Attest:

EDWARD M. FLETCHER, JR.
Attesting Officer

ROBERT GOTTSCHALK
Commissioner of Patents